US008543734B2

(12) United States Patent
McDysan

(10) Patent No.: US 8,543,734 B2
(45) Date of Patent: *Sep. 24, 2013

(54) SYSTEM, METHOD AND APPARATUS THAT ISOLATE VIRTUAL PRIVATE NETWORK (VPN) AND BEST EFFORT TRAFFIC TO RESIST DENIAL OF SERVICE ATTACKS

(75) Inventor: David E. McDysan, Great Falls, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 51 days.

This patent is subject to a terminal disclaimer.

(21) Appl. No.: 12/725,193

(22) Filed: Mar. 16, 2010

(65) Prior Publication Data

US 2010/0175125 A1 Jul. 8, 2010

Related U.S. Application Data

(63) Continuation of application No. 10/667,278, filed on Sep. 22, 2003, now Pat. No. 7,809,860, which is a continuation of application No. 10/023,332, filed on Dec. 17, 2001, now abandoned.

(60) Provisional application No. 60/276,923, filed on Mar. 20, 2001, provisional application No. 60/276,953, filed on Mar. 20, 2001, provisional application No. 60/276,954, filed on Mar. 20, 2001, provisional application No. 60/276,955, filed on Mar. 20, 2001.

(51) Int. Cl.
*G06F 15/16* (2006.01)

(52) U.S. Cl.
USPC ........... 709/249; 709/235; 709/239; 709/245; 370/231; 370/237; 713/153

(58) Field of Classification Search
USPC ................. 709/238, 240, 243, 249, 232, 235, 709/239, 245; 370/231, 235, 395.42, 237; 713/153
See application file for complete search history.

(56) References Cited

U.S. PATENT DOCUMENTS 4,924,500 A 5/1990 Lewis et al.
5,768,271 A 6/1998 Seid et al.
(Continued)

FOREIGN PATENT DOCUMENTS

| EP | 0743777 | 11/1996 |
|---|---|---|
| EP | 0801481 | 10/1997 |
| WO | WO-98/57465 | 12/1998 |

OTHER PUBLICATIONS

"Boundary Router—Definition," PC Mag.com, http://www.pcmag.comiencyclopedia_term/0,2542,t=boundary+router&i=38871,00.asp, 1 page, Retrieved from the internet on Sep. 21, 2006.

(Continued)

*Primary Examiner* — Oanh Duong

(57) ABSTRACT

A network architecture in accordance with the present invention includes a communication network that supports one or more network-based Virtual Private Networks (VPNs). The communication network includes a plurality of boundary routers that are connected by access links to CPE edge routers belonging to the one or more VPNs. To prevent traffic from outside a customer's VPN (e.g., traffic from other VPNs or the Internet at large) from degrading the QoS provided to traffic from within the customer's VPN, the present invention gives precedence to intra-VPN traffic over extra-VPN traffic on each customer's access link through access link prioritization or access link capacity allocation, such that extra-VPN traffic cannot interfere with inter-VPN traffic. Granting precedence to intra-VPN traffic over extra-VPN traffic in this manner entails special configuration of network elements and protocols, including partitioning between intra-VPN and extra-VPN traffic on the physical access link using layer 2 multiplexing and the configuration of routing protocols to achieve logical traffic separation between intra-VPN traffic and extra-VPN traffic at the VPN boundary routers and CPE edge routers. By configuring the access networks, the VPN boundary routers and CPE edge routers, and the routing protocols of the edge and boundary routers in this manner, the high-level service of DoS attack prevention is achieved.

21 Claims, 8 Drawing Sheets

(56) References Cited

U.S. PATENT DOCUMENTS

| | | | |
|---|---|---|---|
| 5,842,040 A | 11/1998 | Hughes et al. | |
| 5,918,019 A | 6/1999 | Valencia | |
| 5,940,591 A | 8/1999 | Boyle et al. | |
| 6,079,020 A | 6/2000 | Liu | |
| 6,173,399 B1 | 1/2001 | Gilbrech | |
| 6,178,505 B1 | 1/2001 | Schneider et al. | |
| 6,182,226 B1 | 1/2001 | Reid et al. | |
| 6,226,748 B1 | 5/2001 | Bots et al. | |
| 6,452,915 B1* | 9/2002 | Jorgensen | 370/338 |
| 6,463,061 B1 | 10/2002 | Rekhter et al. | |
| 6,473,863 B1* | 10/2002 | Genty et al. | 726/3 |
| 6,502,135 B1 | 12/2002 | Munger et al. | |
| 6,526,056 B1 | 2/2003 | Rekhter et al. | |
| 6,532,088 B1* | 3/2003 | Dantu et al. | 370/223 |
| 6,539,483 B1* | 3/2003 | Harrison et al. | 726/1 |
| 6,564,261 B1 | 5/2003 | Gudjonsson et al. | |
| 6,580,721 B1 | 6/2003 | Beshai | |
| 6,611,522 B1 | 8/2003 | Zheng et al. | |
| 6,611,863 B1 | 8/2003 | Banginwar | |
| 6,614,800 B1* | 9/2003 | Genty et al. | 370/464 |
| 6,618,761 B2 | 9/2003 | Munger et al. | |
| 6,633,571 B1* | 10/2003 | Sakamoto et al. | 370/401 |
| 6,680,922 B1 | 1/2004 | Jorgensen | |
| 6,738,910 B1 | 5/2004 | Genty et al. | |
| 6,765,921 B1 | 7/2004 | Stacey et al. | |
| 6,778,498 B2 | 8/2004 | McDysan | |
| 6,822,904 B2 | 11/2004 | Gallo et al. | |
| 6,822,940 B1 | 11/2004 | Zavalkovsky et al. | |
| 6,826,147 B1* | 11/2004 | Nandy et al. | 370/229 |
| 6,826,616 B2 | 11/2004 | Larson et al. | |
| 6,888,842 B1 | 5/2005 | Kirkby et al. | |
| 6,912,232 B1* | 6/2005 | Duffield et al. | 370/468 |
| 6,954,790 B2 | 10/2005 | Forslow | |
| 7,023,860 B1 | 4/2006 | Mauger | |
| 7,072,346 B2 | 7/2006 | Hama | |
| 7,096,495 B1 | 8/2006 | Warrier et al. | |
| 7,120,682 B1 | 10/2006 | Salama | |
| 7,188,180 B2 | 3/2007 | Larson et al. | |
| 7,215,637 B1 | 5/2007 | Ferguson et al. | |
| 7,272,643 B1 | 9/2007 | Sarkar et al. | |
| 7,307,990 B2* | 12/2007 | Rosen et al. | 370/392 |
| 7,315,554 B2 | 1/2008 | Baum et al. | |
| 7,447,151 B2* | 11/2008 | McDysan | 370/231 |
| 7,809,860 B2* | 10/2010 | McDysan | 709/240 |
| 2001/0016914 A1* | 8/2001 | Tabata | 713/201 |
| 2001/0050914 A1 | 12/2001 | Akahane et al. | |
| 2002/0032717 A1 | 3/2002 | Malan et al. | |
| 2002/0036983 A1 | 3/2002 | Widegren et al. | |
| 2002/0038339 A1 | 3/2002 | Xu | |
| 2002/0039352 A1 | 4/2002 | El-Fekih et al. | |
| 2002/0042875 A1 | 4/2002 | Shukla | |
| 2002/0073337 A1 | 6/2002 | Ioele et al. | |
| 2002/0075901 A1 | 6/2002 | Perlmutter et al. | |
| 2002/0085561 A1* | 7/2002 | Choi et al. | 370/392 |
| 2002/0097725 A1 | 7/2002 | Dighe et al. | |
| 2002/0099854 A1* | 7/2002 | Jorgensen | 709/249 |
| 2002/0101868 A1* | 8/2002 | Clear et al. | 370/389 |
| 2002/0107908 A1 | 8/2002 | Dharanikota | |
| 2002/0150083 A1* | 10/2002 | Fangman et al. | 370/352 |
| 2003/0016672 A1 | 1/2003 | Rosen et al. | |
| 2003/0088697 A1 | 5/2003 | Matsuhira | |
| 2003/0110288 A1* | 6/2003 | Ramanujan et al. | 709/238 |
| 2003/0110294 A1* | 6/2003 | Luo | 709/245 |
| 2003/0123446 A1 | 7/2003 | Muirhead et al. | |
| 2003/0147408 A1 | 8/2003 | Datta et al. | |
| 2003/0167342 A1 | 9/2003 | Munger et al. | |
| 2003/0177381 A1 | 9/2003 | Ofek et al. | |
| 2003/0177391 A1 | 9/2003 | Ofek et al. | |
| 2003/0200441 A1* | 10/2003 | Jeffries et al. | 713/181 |
| 2004/0034702 A1 | 2/2004 | He | |
| 2004/0223500 A1 | 11/2004 | Sanderson et al. | |
| 2004/0225895 A1* | 11/2004 | Mukherjee et al. | 713/201 |
| 2004/0266420 A1 | 12/2004 | Malinen et al. | |
| 2004/0268121 A1* | 12/2004 | Shelest et al. | 713/156 |
| 2005/0053079 A1 | 3/2005 | Havala | |
| 2005/0088977 A1 | 4/2005 | Roch et al. | |

OTHER PUBLICATIONS

Edge Router Definition, http://www.pcmag.com/encyclopedia_term/0,2542,t=edge+router&i=42365,00.asp.

Bernet, et al., "RFC 2998: A Framework for Integrated Services Operation Over Diffserv Networks," Network Working Group, The Internet Society, 29 pages, Nov. 2000.

Blake, et al, "RFC 2475: An Architecture for Differentiated Services", The Internet Society, Network Working Group, 31 pages, Dec 1998.

Braden, et al., RFC 1633: Integrated Services in the Internet Architecture: an Overview, Network Working Group, 31 pages, Jun. 1994.

Braden, et al., "RFC 2205: Resource ReSerVation Protocol (RSVP)—Version 1 Functional Specification," Network Working Group, 105 pages, Sep. 1997.

Bradley, et al., "RFC 1490: Multiprotocoi Interconnect Over Frame Relay," Network Working Group, http://www.rfc-editor.org/rfc/rfc1490.txt, pp. 1-35, Jul. 1993.

Erwin, et al., "Virtual Private Networks, Second Edition," O'Reilly Media Inc, Excerpts from Chapters 1 & 10, ISBN-13: 978-1-56592-529-8, ISBN-10: 1-565-92529-7, 20 pages, Dec. 18, 1998.

Fryer, "Microsoft Computer Dictionary, Fourth Edition," ISBN 0-7356-0615-3, Microsoft Press, pp. 132, 133, 390, Copyright 1999.

Gleeson, et al., "A Framwork for IP Based Virtual Private Networks—Internet Draft," Internet Engineering Task Force (IETF), The Internet Society, pp. 1-16, Oct. 1999.

Gleeson, et al, "RFC 2764: A Framework for IP Based Virtual Private Networks," Network Working Group, The Internet Society, 58 pages, Feb. 2000.

Liao et al., "Dynamic Edge Provisioning for Core IP Networks," Proceedings of the 8th International Workshop on Quality of Service (IEEE IWQoS 2000), Dept. of Electrical Engineering, Columbia University, 10 pages, Jun. 2000.

Muthukrishnan et al., "A Core MPLS IP VPN Architecture," Network Working Group, The Internet Society, 15 pages, Sep. 2000

Postel, "RFC 761: DOD Standard Transmission Control Protocol," Information Sciences Institute, University of Southern California. 88 pages, Jan. 1980.

Rosen et al., "BGP/MPLS VPNs, RFC 2547," Cisco Systems, Inc., Network Working Group, The Internet Society, pp. 1-25, Mar. 1999.

Vegesna, "IP Quality of Service," Excerpts from Chapters 1, 2, 8 & 9, ISBN-10: 1-57870-116-3, ISBN-13: 978-1-57870-116-2, Cisco Press, 73 pages, Jan. 23, 2001.

Armitage, "Quality of Service in IP Networks: Foundations for a Multi-Service Internet," ISBN-10: 1-57870-189-9, http://my.safaribooksonline.com/book/networking/ip/1578701899, eight pages, Apr. 7, 2000.

Kavak, "Ericsson's Network-Based IP-VPN Solutions," XP000966163, ISSN: 0014-0171, Ericsson Review No. 3, 2000, pp. 178-191, Copyright 2000.

O'Leary, "Virtual Private Networks: Progress and Challenges,"XP002295672, Juniper Networks, Inc., The North American Network Operators' Group Nanog 18th Meeting, 21 pages, Feb. 7, 2000.

Ould-Brahim, "I-D Action: draft-ouldbrahim-vpn-vr-03.txt," http://www.spinics.net/lists/ietf-ann/msg11033.html, Internet Engineering Task Force (IETF), The Internet Society, XP002295822, two pages, Mar. 2, 2001.

Ould-Brahim, "Network Based IP VPN Architecture Using Virtual Routers, draft-ouldbrahim-vpn-vr-03.txt," Provider Provisioned VPN Working Group, Internet Engineering Task Force (IETF), The Internet Society, pp. 1-18, Mar. 2001.

* cited by examiner

SYSTEM, METHOD AND APPARATUS THAT ISOLATE VIRTUAL PRIVATE NETWORK (VPN) AND BEST EFFORT TRAFFIC TO RESIST DENIAL OF SERVICE ATTACKS

RELATED APPLICATIONS

This application is a Continuation of U.S. patent application Ser. No. 10/667,278 filed Sep. 22, 2003, which claims priority to U.S. patent application Ser. No. 10/023,332, filed Dec. 17, 2001, and further claims priority to U.S. Provisional Application Ser. No. 60/276,923 filed Mar. 20, 2001, U.S. Provisional Patent Application Ser. No. 60/276,953, filed Mar. 20, 2001, U.S. Provisional Patent Application Ser. No. 60/276,954 filed Mar. 20, 2001 and U.S. Provisional Application Ser. No. 60/276,955 filed Mar. 20, 2001, and incorporated herein by reference in their entireties.

The present application is related to the following co-pending applications, which are assigned to the assignee of the present invention, and incorporated herein by reference in their entireties:

(1) U.S. patent application Ser. No. 10/023,331, filed Dec. 17, 2001, entitled "VIRTUAL PRIVATED NETWORK (VPN)-AWARE CUSTOMER PREMISEDS EQUIPMENT (CPE) EDGE ROUTER;" AND (2) U.S. patent application Ser. No. 10/023,043, filed Dec. 17, 2001, entitled "SYSTEM, METHOD AND APPARATUS THAT EMPLOY VIRTUAL PRIVATE NETWORKS TO RESIST IP QoS DENIAL OF SERVICE ATTACKS."

The following publications available through the Internet Engineering Task Force (IETF) are also incorporated by reference in their entireties as background information:

(1) Branden, R., Clark D. and S. Shenker, "Integrated Services in the Internet Architecture: an Overview," IETF, RFC 1633, June 1994;

(2) Branden, R., Zhang, L., Berson, S., Herzong, S. and S. Jamin, "Resources ReSerVation Protocol (RSVP)_Version 1 Functional Specification," IETF, RFC 2205, September 1997;

(3) Blake, S., Black, D. Carlson, M., Davies, E., Wang, Z. and W. Weiss, "An Architecture for Differentiated Services," IETF, RFC 2475, December 1998;

(4) Rosen, E. and Y. Rekhter, "BGP/MPLS VPNs," IETF, RFC 2547, March 1999;

(5) Gleeson, B., Lin., A., Heinanen, J., Finland, T., Armitage, G. and A. Malis, "A Framework for IP Based Virtual Private Networks," IETF, RFC 2764, February 2000;

(6) Muthukrishnan, K. and A. Malis, "A Core MPLS IP VPN Architecture," IETF, RFC 2917, September 2000; and (7) Bernet, Y., Ford, P., Yavatkar, R., Baker, F., Zhang, L., Speer, M., Braden, R., Davie, B., Wroclawski, J. and E. Felstaine, "A Framework for Integrated Services Operation over Diffwerv Networks," IETF, RFC 2998, November 2000.

BACKGROUND OF THE INVENTION

1. Technical Field

The present invention relates to communication networks and, in particular, to the prevention of denial of service attacks in a public communication network, for example, the Internet. Still more particularly, the present invention relates to method, system and apparatus for preventing denial of service attacks in a communication network having a shared network infrastructure by separating the allocation and/or prioritization of access capacity to traffic of sites within a virtual private network (VPN) from the allocation and/or prioritization of access capacity to sites in another VPN or the public network.

2. Description of the Related Art

For network service providers, a key consideration in network design and management is the appropriate allocation of access capacity and network resources between traffic originating from VPN customer sites and traffic originating from outside the VPN (e.g., from the Internet or other VPNs). This consideration is particularly significant with respect to the traffic of VPN customers whose subscription includes a Service Level Agreement (SLA) requiring the network service provider to provide a minimum communication bandwidth or to guarantee a particular Quality of Service (QoS). Such service offerings require the network service provider to implement a network architecture and protocol that achieve a specified QoS and ensure sufficient access capacity and network resources are available for communication with other VPN sites separate from communication with hosts that are not part of the VPN.

In Internet Protocol (IP) networks, a straightforward approach to achieving QoS and implementing admission control comparable to that of connection-oriented network services, such as voice or Asynchronous Transfer Mode (ATM), is to emulate the same hop-by-hop switching paradigm of signaling resource reservations for the flow of IP packets requiring QoS. In fact, the IP signaling standard developed by the Internet Engineering Task Force (IETF) for Integrated Services (Intserv) adopts precisely this approach. As described in IETF RFC 1633, Intserv is a per-flow IP QoS architecture that enables applications to choose among multiple, controlled levels of delivery service for their data packets. To support this capability, Intserv permits an application at a transmitter of a packet flow to use the well-known Resource ReSerVation Protocol (RSVP) defined by IETF RFC 2205 to request a desired QoS class at a specific level of capacity from all network elements along the path to a receiver of the packet flow. After receiving an RSVP PATH message requesting a resource reservation and an RSVP RESV message confirming resource reservation from an upstream node, individual network elements along the path implement mechanisms to control the QoS and capacity delivered to packets within the flow.

FIG. 1 illustrates the implications of utilizing a conventional Intserv implementation to perform admission control. As shown in FIG. 1, an exemplary IP network 10 includes N identical nodes (e.g., service provider boundary routers) 12, each having L links of capacity X coupled to Customer Premises Equipment (CPE) 14 for L distinct customers. In a per-flow, connection-oriented approach, each node 12 ensures that no link along a network path from source to destination is overloaded. Looking at access capacity, a per-flow approach is able to straightforwardly limit the input flows on each of the ingress access links such that the sum of the capacity for all flows does not exceed the capacity X of any egress access link (e.g., Link 1 of node 12a). A similar approach is applicable to links connecting unillustrated core routers within IP network 10.

Although conceptually very simple, the admission control technique illustrated in FIG. 1 has a number of drawbacks. Most importantly, Intserv admission control utilizing RSVP has limited scalability because of the processing-intensive signaling RSVP requires in the service provider's boundary and core routers. In particular, RSVP requires end-to-end signaling to request appropriate resource allocation at each network element between the transmitter and receiver, policy queries by ingress node 12b-12d to determine which flows to admit and police their traffic accordingly, as well as numerous other handshake messages. Consequently, the processing required by Intserv RSVP signaling is comparable to that of telephone or ATM signaling and requires a high performance (i.e., expensive) processor component within each boundary or core IP router to handle the extensive processing required by such signaling. RSVP signaling is soft state, which means the signaling process is frequently refreshed (by default once every 30 seconds) since the forwarding path across the IP network may change and therefore information about the QoS and capacity requested by a flow must be communicated periodically. This so-called soft-state mode of operation creates an additional processing load on a router even greater than that of an ATM switch. Furthermore, if the processor of a boundary router is overloaded by a large number of invalid RSVP requests, the processor may crash, thereby disrupting service for all flows for all customers being handled by the router with the failing processor.

In recognition of the problems associated with implementing admission control utilizing conventional Intserv RSVP signaling, the IETF promulgated the Differentiated Services (Diffserv or DS) protocol defined in RFC 2475. Diffserv is an IP QoS architecture that achieves scalability by conveying an aggregate traffic classification within a DS field (e.g., the IPv4 Type of Service (TOS) byte or IPv6 traffic class byte) of each IP-layer packet header. The first six bits of the DS field encode a Diffserv Code Point (DSCP) that requests a specific class of service or Per Hop Behavior (PHB) for the packet at each node along its path within a Diffserv domain.

In a Diffserv domain, network resources are allocated to aggregates of packet flows in accordance with service provisioning policies, which govern DSCP marking and traffic conditioning upon entry to the Diffserv domain and traffic forwarding within the Diffserv domain. The marking (i.e., classification) and conditioning operations need be implemented only at Diffserv network boundaries. Thus, rather than requiring end-to-end signaling between the transmitter and receiver to establish a flow having a specified QoS, Diffserv enables an ingress boundary router to provide the QoS to aggregated flows simply by examining and/or marking each IP packet's header.

Although the Diffserv standard addresses Intserv scalability limitation by replacing Intserv's processing-intensive signaling with a simple per packet marking operation that can easily be performed in hardware, implementation of the Diffserv protocol presents a different type of problem. In particular, because Diffserv allows host marking of the service class, a Diffserv network customer link can experience a Denial of Service (DoS) attack if a number of hosts send packets to that link with the DS field set to a high priority. It should be noted that a set of hosts can exceed the subscribed capacity of a Diffserv service class directly by setting the DSCP or indirectly by submitting traffic that is classified by some other router or device to a particular DSCP. In Diffserv, an IP network can only protect its resources by policing at the ingress routers to ensure that each customer interface does not exceed the subscribed capacity for each Diffserv service class. However, this does not prevent a DoS attack.

FIG. 2 depicts a DOS attack scenario in an exemplary IP network 10' that implements the conventional Diffserv protocol. In FIG. 2, a number of ingress nodes (e.g., ingress boundary routers) 12b'-12d' each admit traffic targeting a single link of an egress node (e.g., egress boundary router) 12a'. Although each ingress nodes 12' polices incoming packets to ensure that customers do not exceed their subscribed resources at each DSCP, the aggregate of the admitted flows exceeds the capacity X of egress Link 1 of node 12a', resulting in a denial of service to the customer site served by this link.

SUMMARY OF THE INVENTION

In view of the limitations attendant to conventional implementations of the Intserv and Diffserv standards, the present invention recognizes that it would be useful and desirable to provide a method, system and apparatus for data communication that support a communication protocol that, unlike conventional Intserv implementations, is highly scalable and yet protects against the DoS attacks to which conventional Diffserv and other networks are susceptible.

A network architecture in accordance with the present invention includes a communication network that supports one or more network-based Virtual Private Networks (VPNs). The communication network includes a plurality of boundary routers that are connected by access links to CPE edge routers belonging to the one or more VPNs. To prevent traffic from outside a customer's VPN (e.g., traffic from other VPNs or the Internet at large) from degrading the QoS provided to traffic from within the customer's VPN, the present invention gives precedence to intra-VPN traffic over extra-VPN traffic on each customer's access link through access link prioritization or access link capacity allocation, such that extra-VPN traffic cannot interfere with inter-VPN traffic. Granting precedence to intra-VPN traffic over extra-VPN traffic in this manner entails special configuration of network elements and protocols, including partitioning between intra-VPN and extra-VPN traffic on the physical access link and access network using layer 2 switching and multiplexing, as well as the configuration of routing protocols to achieve logical traffic separation between intra-VPN traffic and extra-VPN traffic at the VPN boundary routers and CPE edge routers. By configuring the access networks, the VPN boundary routers and CPE edge routers, and the routing protocols of the edge and boundary routers in this manner, the high-level service of DoS attack prevention is achieved.

Additional objects, features, and advantages of the present invention will become apparent from the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
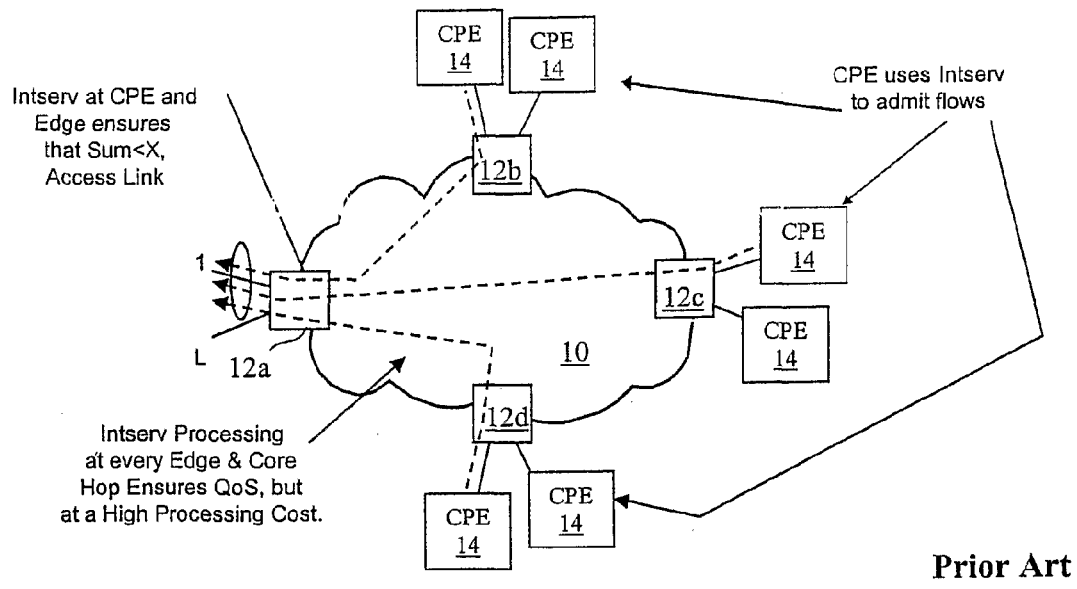
FIG. 1 depicts a conventional Integrated Services (Intserv) network that implements per-flow QoS utilizing RSVP.
Figure 2:
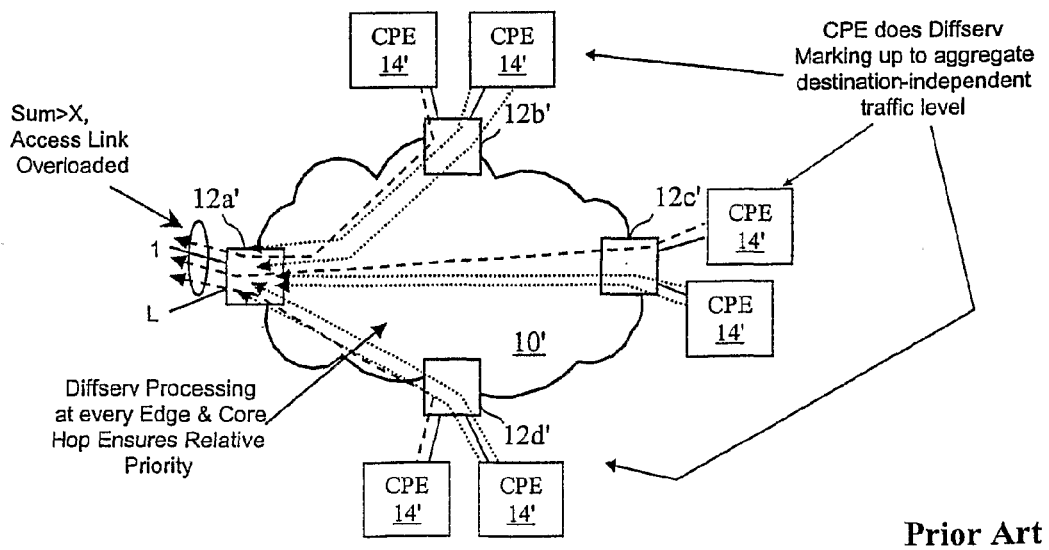
FIG. 2 illustrates a conventional Differentiated Services (Diffserv) network that implements QoS on aggregated traffic flows utilizing DSCP markings in each packet header and is therefore vulnerable to a Denial of Service (DoS) attack.
Figure 3:
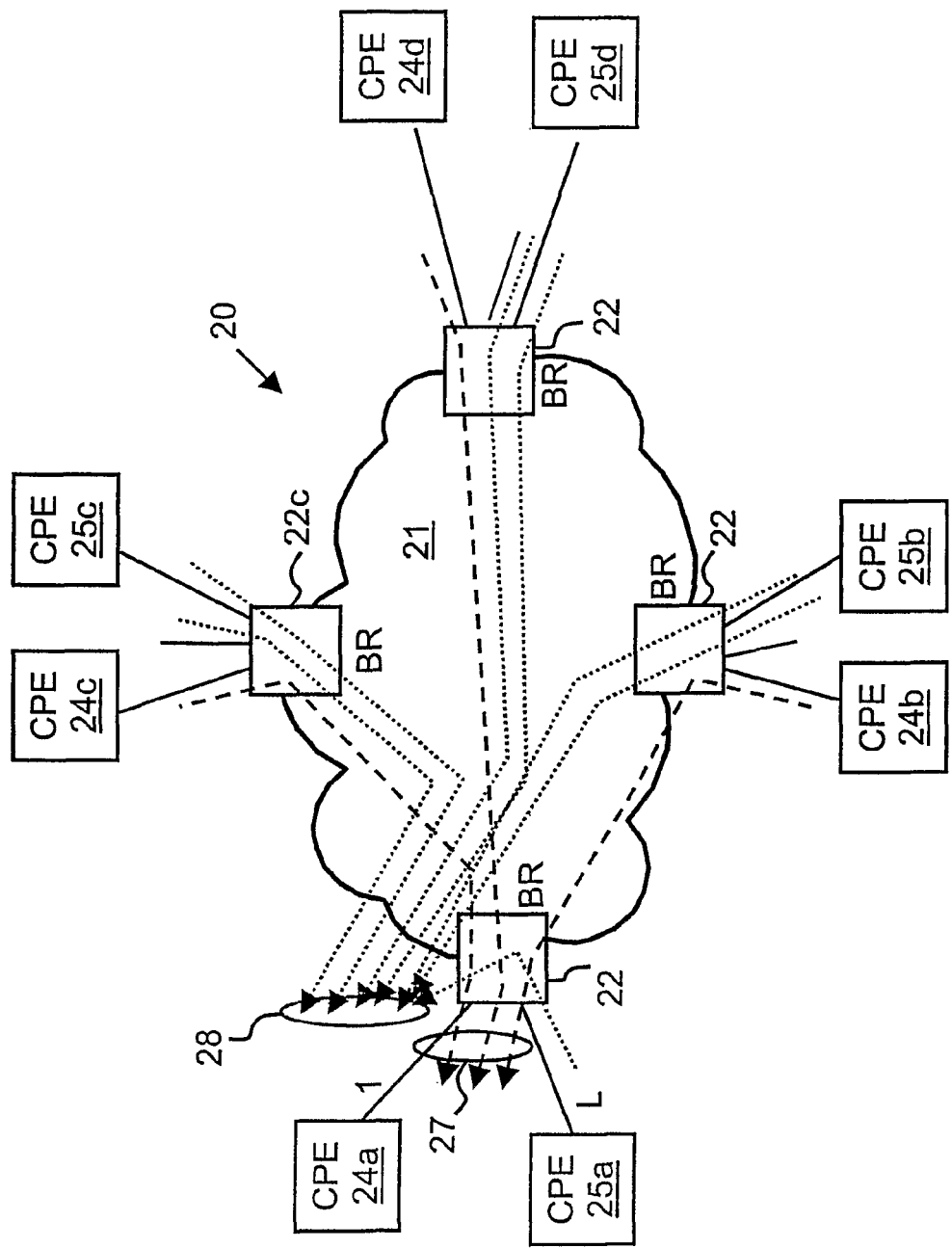
FIG. 3 depicts an exemplary communication network that, in accordance with a preferred embodiment of the present invention, resists DoS attacks by partitioning allocation and/or prioritization of access capacity by reference to membership in Virtual Private Networks (VPNs)

With reference again to the figures and, in particular, with reference to FIG. 3, there is depicted a high level block diagram of an exemplary network architecture 20 that, in accordance with the present invention, provides a scalable method of providing QoS to selected traffic while protecting a Virtual Private Network (VPN) customer's access and trunk network links against DoS attacks. Similar to the prior art network illustrated in FIG. 2, network architecture 20 of FIG. 3 includes a Diffserv network 21 having N service provider boundary routers (BRs) 22 that each have L access links. What is different in network architecture 20 is that Diffserv network 21 supports a plurality of VPN instances, of which two are shown in the figure as identified by the access links of boundary routers 22 coupled to CPE edge routers (ERs) for a first network service customer 24 and an ER for a second network service customer 25 at each of four sites, respectively identified by letters a through d. Each CPE ER provides network service to a customer's local area networks (LANs). The service provider network-based VPN may support many more customers than the two shown in this figure.

In the exemplary communication scenario depicted in FIG. 3, hosts within the LANs of the first VPN customer coupled to CPE edge routers 24b-24d, those within a second VPN customer's LANs coupled to CPE edge routers 25a-25d, as well as sites coupled to other unillustrated CPE edge routers linked to boundary routers 22a-22d, may all transmit packet flows targeting the LAN coupled to the first VPN customer CPE edge router 24a. If the conventional Diffsery network of the prior art described above with respect to FIG. 2 were implemented, the outgoing access link 1 of boundary router 22a coupled to CPE edge router 24a could be easily overwhelmed by the convergence of these flows, resulting in a DoS. However, in accordance with the present invention, Diffserv network 21 of FIG. 3 prevents a DoS attack from sites outside the VPN by directing intra-VPN traffic to a first logical port 27 on physical access link 1 of boundary router 22a, while directing traffic from other VPNs or other sites to a second logical port 28 on physical access link 1 of boundary router 22a.

To prevent traffic from outside a customer's community of interest (e.g., traffic from other VPNs or the Internet at large) from degrading the QoS provided to traffic from within the customer's community of interest (e.g., traffic from other hosts in the same business enterprise), the present invention either prioritizes intra-VPN traffic over extra-VPN traffic, or allocates access link capacity such that extra-VPN traffic cannot interfere with inter-VPN traffic. In other words, as described in detail below, each boundary router 22 gives precedence on each customer's access link to traffic originating within the customer's VPN, where a VPN is defined herein as a collection of nodes coupled by a shared network infrastructure in which network resources and/or communications are partitioned based upon membership of a collection of nodes. Granting precedence to intra-VPN traffic over extra-VPN traffic in this manner entails special configuration of network elements and protocols, including partitioning of the physical access between intra-VPN and extra-VPN traffic using layer 2 multiplexing and the configuration of routing protocols to achieve logical traffic separation. In summary, the configuration of the CPE edge router, the access network, the network-based VPN boundary router and the routing protocols involved in the edge and boundary routers cooperate to achieve the high-level service of DoS attack prevention, as detailed below. Conventional Diffserv and CPE edger router IPsec-based IP VPN implementations, by contrast, do not segregate traffic destined for sites within the same VPN (i.e., intra-VPN traffic) and traffic sent from other regions of the Internet (i.e., extra-VPN traffic).

Referring now to FIGS. 4-8, at least two classes of implementations of the generalized network architecture 20 depicted in FIG. 3 are possible. In particular, a network in accordance with the present invention can be realized as a CPE-based VPN implementation, as described below with reference to FIGS. 4-6, or as a network-based VPN implementation, as described below with reference to FIGS. 7-8.

Figure 4:
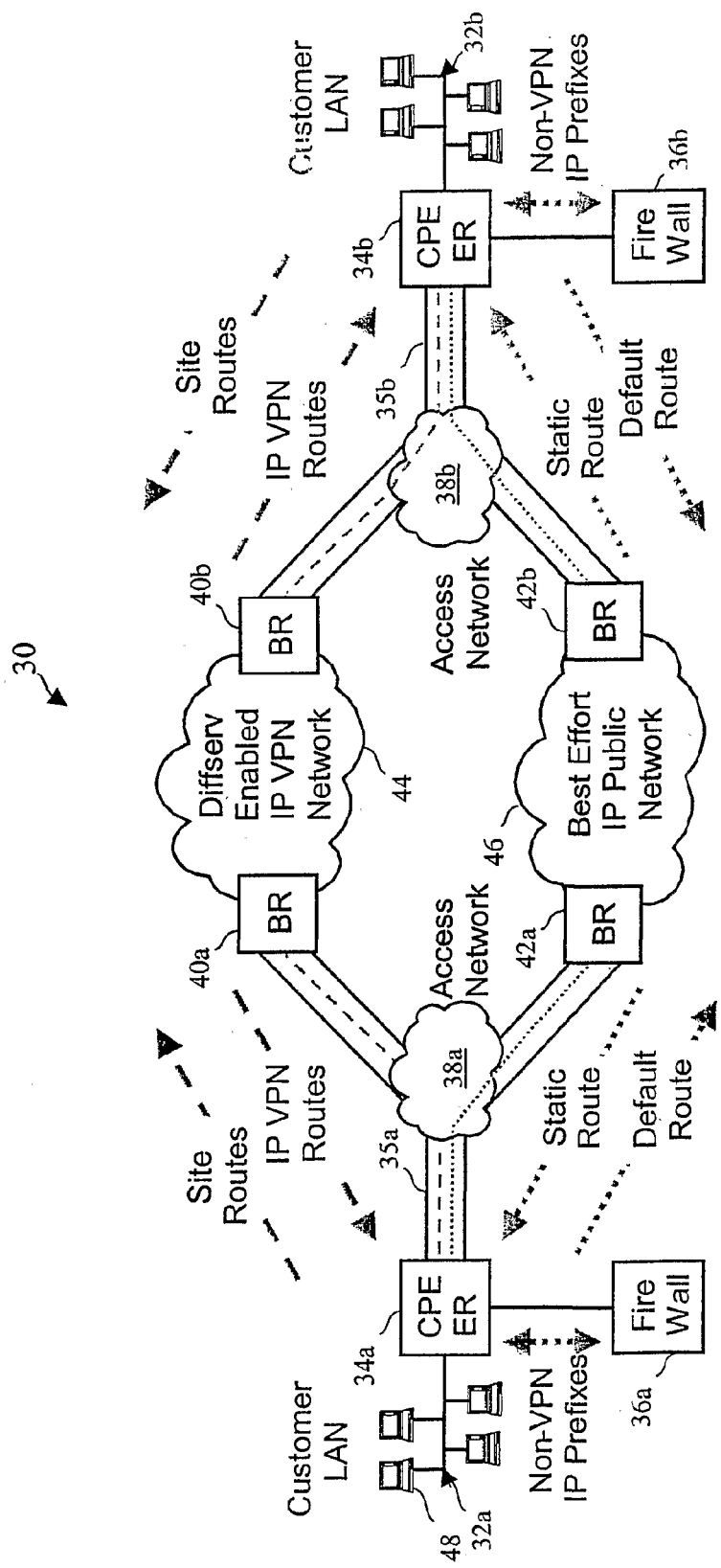
FIG. 4 illustrates an exemplary network architecture that provides a CPE-based VPN solution to the DoS attack problem.

Referring first to FIG. 4, there is illustrated an exemplary network architecture 30 that employs a CPE-based VPN to resist DoS attacks. The depicted network architecture includes a Diffserv-enabled IP VPN network 44, a best effort IP public network 46, and a plurality of customer Local Area Networks (LANs) 32. Customer LANs 32 each include one or more hosts 48 that can function as a transmitter and/or receiver of packets communicated over one or both of networks 44 and 46. In the exemplary implementation illustrated in FIG. 4, it is assumed that customer LANs 32a and 32b belong to the same community of interest (i.e., VPN), such as a business enterprise.

Each customer LAN 32 is coupled by a respective CPE edge router 34 and physical access link 35 to a respective access network (e.g., an L2 access network) 38. Access networks 38a and 38b each have a first L2 access logical connection to a boundary router (BR) 40 of Diffserv-enabled IP VPN network 44 and a second L2 access logical connection to a boundary router (BR) 42 of best effort IP public network 46. As illustrated in FIG. 4 by differing line styles representing intra-VPN and extra-VPN traffic, VPN-aware CPE edge routers 34a and 34b route only packets with IP address prefixes belonging to the IP VPN via Diffserv-enabled IP VPN network 44, and route all other traffic via best effort IP public network 46. To enhance security of customer LANs 32, CPE edge routers 34a and 34b send all traffic to and from best effort IP public network 46 through a respective one of firewalls 36a and 36b.

In the network architecture illustrated in FIG. 4, DoS attacks originating outside of the IP VPN are prevented by configuration of boundary routers 40a-40b and 42a-42b to appropriately utilize the two logical connections of access networks 38a and 38b to grant precedence to intra-VPN traffic. For example, in a first configuration, a higher priority is assigned to the L2 access logical connection with Diffserv-enabled IP VPN network 44 than to the L2 access logical connection with best effort public IP network 46. L2 access networks that support such prioritization of access links 35 include Ethernet (e.g., utilizing Ethernet priority), ATM (e.g., utilizing ATM service categories), and many frame relay (FR) network implementations. These implementations can each be provisioned utilizing well-known techniques. With this configuration, each boundary router 40 of Diffserv enabled IP VPN network 44 shapes the transmission rate of packets to its logical connection to access network 38 to a value less than that of the access link to prevent starvation of the L2 access logical connection to best effort IP public network 46. Alternatively, in a second configuration, boundary routers 40a-40b and 42a-42b may be individually configured to shape the traffic destined for each L2 access network logical connection to a specified rate, where the sum of these rates is less than or equal to the transmission capacity of the physical access medium linking CPE edge routers 34 and access networks 38. In either of these alternative configurations, boundary routers 40 and 42 perform scheduling and prioritization based upon packets' DSCP markings and shape to the capacity allocated to the access network connection for IP VPN traffic.

As will be appreciated by those skilled in the art, selection of which of the alternative configurations to implement is a matter of design choice, as each configuration has both advantages and disadvantages. For example, with the first configuration, coordination of the access network configuration between networks 44 and 46 is easier. However, if access networks 38 implement only strict priority, then IP VPN traffic from Diffserv-enabled IP VPN network 44 may starve best effort traffic communicated over IP public network 46. The second configuration addresses this disadvantage by allocating a portion of the access link capacity to each type of network access (i.e., both intra-VPN and extra-VPN). However, if boundary routers 40 and 42 shape traffic in accordance with the second configuration, unused access capacity to one of networks 44 and 46 cannot be used to access the other network. That is, since the shapers are on separate boundary routers 40 and 42, only non-work-conserving scheduling is possible.

Figure 5:
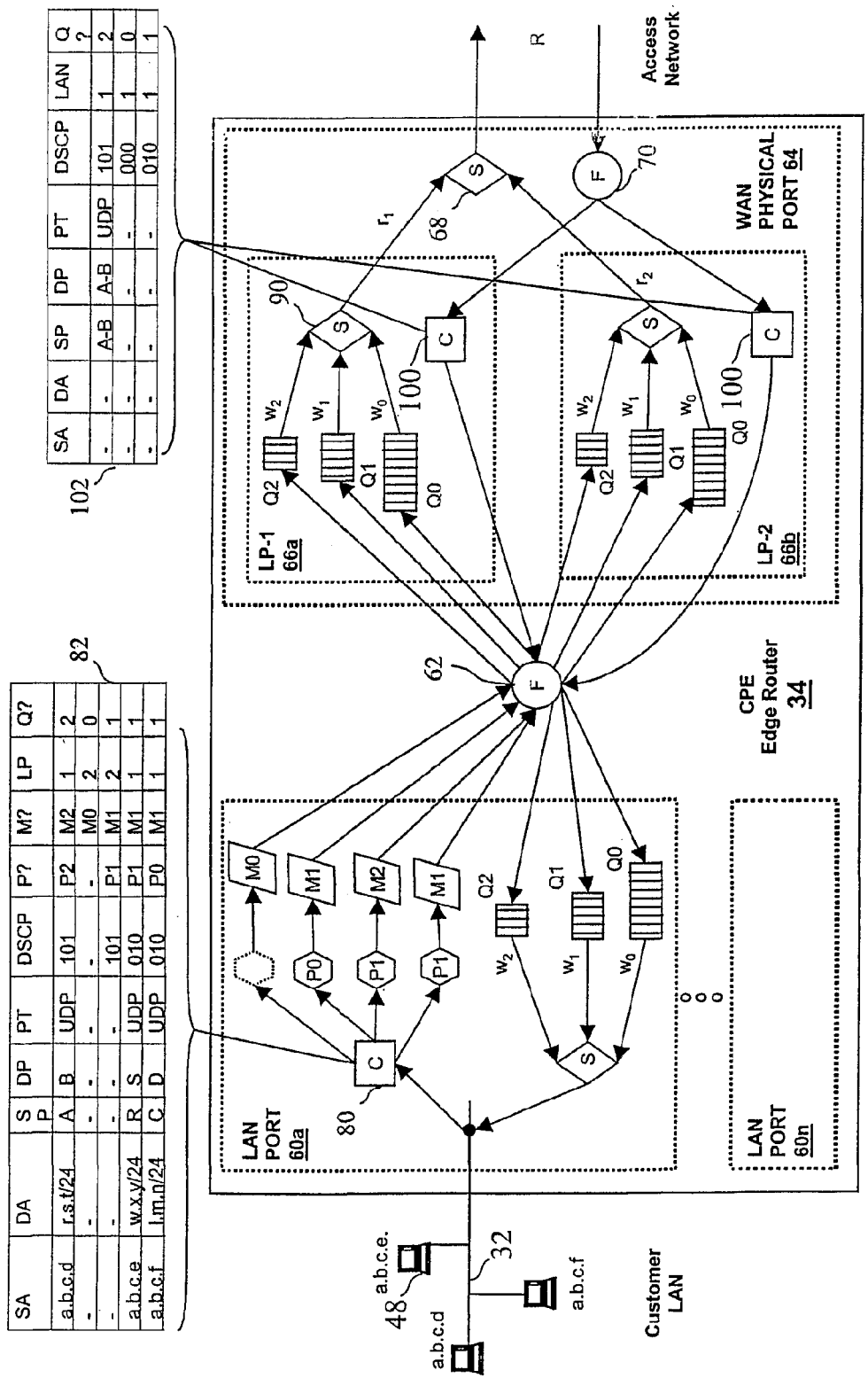
FIG. 5 is a more detailed block diagram of a QoS-aware CPE edge router that may be utilized within the network architectures depicted in FIGS. 4 and 7.

With reference now to FIG. 5, there is illustrated a more detailed block diagram of a QoS-aware CPE edge router 34 that may be utilized within the network architecture depicted in FIG. 4. As illustrated, CPE edge router 34 includes a number of LAN ports 60, which provide connections for a corresponding number of customer LANs 32. For example, in FIG. 5, LAN port 60a is connected to a customer LAN 32 including a number of hosts 48 respectively assigned 32-bit IP addresses "a.b.c.d," "a.b.c.e.," and "a.b.c.f."

Each LAN port is also coupled to a forwarding function 62, which forwards packets between LAN ports 60 and one or more logical ports (LPs) 66 residing on one or more Wide Area Network (WAN) physical ports 64 (only one of which is illustrated). LPs 66, which each comprise a layer-2 sub-interface, may be implemented, for example, as an Ethernet Virtual LAN (VLAN), FR Data Link Connection Identifier (DLCI), ATM Virtual Channel Connection (VCC), or Point-to-Point Protocol (PPP)/High-Level Data Link Control (HDLC) running on a Time Division Multiplexed (TDM) channel. WAN physical port 64 employs a scheduler 68 to multiplex packets from logical ports 64 onto the transmission medium of an access network 38 and forwards packets received from access network 38 to the respective logical port utilizing a forwarding function 70.

When a LAN port 60 of CPE edge router 34 receives packets from a customer LAN 32, the packets first pass through a classifier 80, which determines by reference to a classifier table 82 how each packet will be handled by CPE edge router 34. As illustrated in FIG. 5, classifier table 82 may have a number of indices, including Source Address (SA) and Destination Address (DA), Source Port (SP) and Destination Port (DP), Protocol Type (PT), DSCP, or other fields from packets' link, network or transport layer headers. Based upon a packet's values for one or more of these indices, classifier 72 obtains values for a policer (P), marker (M), destination LP, and destination LP queue (Q) within CPE edge router 34 that will be utilized to process the packet. In alternative embodiments of the present invention, lookup of the destination LP and destination LP queue entries could be performed by forwarding function 62 rather than classifier 80.

As shown, table entry values within classifier table 82 may be fully specified, partially specified utilizing a prefix or range, or null (indicated by "–"). For example, the SAs of hosts 48 of LAN 32 are fully specified utilizing 32-bit IP addresses, DAs of several destination hosts are specified utilizing 24-bit IP address prefixes that identify particular IP networks, and a number of index values and one policing value are null. In general, the same policer, marker, and/or shaper values, which for Intserv flows are taken from RSVP RESV messages, may be specified for different classified packet flows. For example, classifier table 82 specifies that policer P1 and marker M1 will process packets from any SA marked with DSCP "101" as well as packets having a SA "a.b.c.e" marked with DSCP "010." However, classifier table 82 distinguishes between flows having different classifications by specifying different destination LP values for traffic having a DA within the VPN (i.e., intra-VPN traffic) and traffic addressed to hosts elsewhere in the Internet (i.e., extra-VPN traffic). Thus, because IP address prefixes "r.s.t," "w.x.y," and "l.m.n" all belong to the same VPN as network 32, traffic matching these DAs is sent via LP-1 66a to other sites within the same VPN over the Diffserv-enabled IP VPN network 44 while all other traffic is sent via LP-2 66b to best effort IP public network 46.

The logical port 66 and LP queue to which packets are forwarded can be determined by static configuration or dynamically by a routing protocol. In either case, a VPN route should always have precedence over an Internet route if a CPE router 34 has both routes installed for the same destination IP address. Such priority can be achieved in any of several ways, including (1) use of Interior Gateway Protocol (IGP) (i.e., OSPF and IS-IS) to install VPN routes and EBGP or static routing to install Internet routes or (2) use of EBGP to install both VPN routes and Internet routes, with a higher local preference being given for VPN routes.

After classification, packets are policed and marked, as appropriate, by policers P0, P1 and markers M0, M1, M2 as indicated by classifier table 82 and then switched by forwarding function 62 to either logical port 66a or 66b, as specified by the table lookup. Within the specified logical port 66, packets are directed to the LP queues Q0-Q02 specified by classifier table 82. LP queues Q0-Q2 perform admission control based upon either available buffer capacity or thresholds, such as Random Early Detection (RED). A scheduler 90 then services LP queues Q0-Q2 according to a selected scheduling algorithm, such as First In, First Out (FIFO), Priority, Weighted Round Robin (WRR), Weighted Fair Queuing (WFQ) or Class-Based Queuing (CBQ). For example, in the illustrated embodiment, scheduler 90 of LP-2 66a implements WFQ based upon the weight $w_i$ associated with each LP queue i and the overall WFQ scheduler rate $r_2$ for logical port 2, thereby shaping traffic to the rate $r_2$. Finally, as noted above, scheduler 68 of physical WAN port 64 services the various logical ports 66 to control the transmission rate to access network 38.

CPE edge router 34 receives packets from access network 38 at WAN physical port 64 and then, utilizing forwarding function 70, forwards packets to the appropriate logical port 66a or 66b as indicated by configuration of access network 38 as it maps to the logical ports. At each logical port 66, packets pass through a classifier 100, which generally employs one or more indices within the same set of indices discussed above to access a classifier table 102. In a typical implementation, the lookup results of classifiers 100 are less complex than those of classifier 80 because policing and marking are infrequently required. Thus, in the depicted embodiment, packets are forwarded by forwarding function 62 directly from classifiers 100 of logical ports 66 to the particular queues Q0-Q2 of LAN port 60a specified in the table lookup based upon the packets' DSCPs. As described above, queues Q0-Q2 of LAN port 60a are serviced by a scheduler 102 that implements WFQ and transmits packets to customer LAN 32.

Figure 6A:
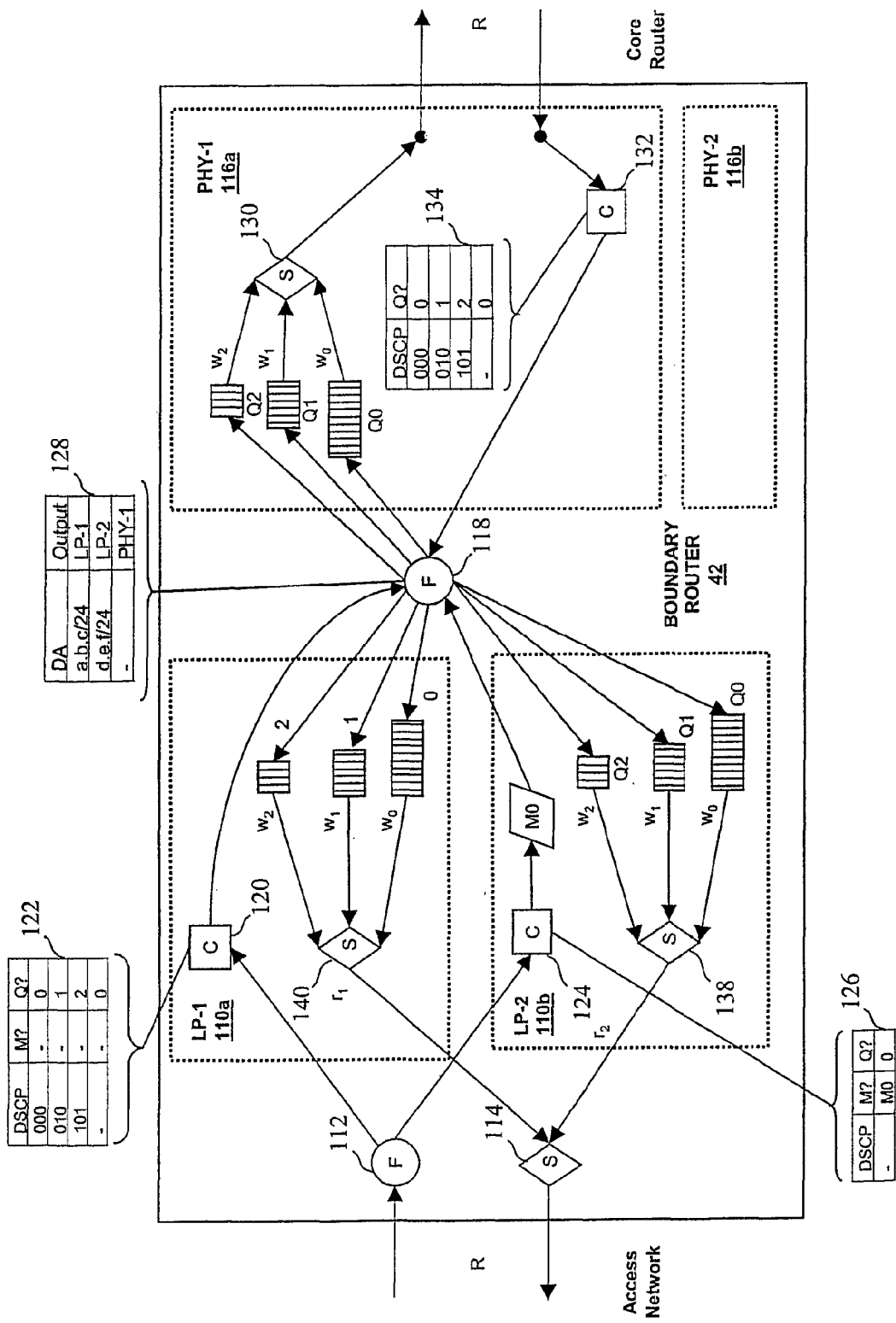
FIG. 6A is a more detailed block diagram of a QoS-aware boundary router without VPN function that may be utilized within the network architectures illustrated in FIGS. 4 and 7.

Referring now to FIG. 6A, there is depicted a more detailed block diagram of a QoS-aware boundary router without any VPN function, which may be utilized within the network architecture of FIG. 4, for example, to implement boundary routers 42. As shown, boundary router 42 of FIG. 6A includes a plurality of physical ports 116, a plurality of logical ports 110 coupled to access network 38 by a forwarding function 112 for incoming packets and a scheduler 114 for outgoing packets, and a forwarding function 118 that forwards packets between logical ports 110 and physical ports 116. The implementation of multiple physical ports 116 permits fault tolerant connection to network core routers, and the implementation of multiple logical ports coupled to access network 38 permits configuration of one logical port (i.e., LP-1 110a) as a Diffserv-enabled logical port and a second logical port (i.e., LP-2 110b) as a best-effort logical port.

Thus, for traffic communicated from access network 38 through LP-2 110b of boundary router 42 towards the network core, classifier 124 of LP-2 110b directs all packets to marker M0 in accordance with classifier table 126. Marker M0 remarks all packets received at LP-2 110b with DSCP 000, thus identifying the packets as best-effort traffic. Classifier 120 of LP-1 110a, by contrast, utilizes classifier table 122 to map incoming packets, which have already received DSCP marking at a trusted CPE (e.g., service provider-managed CPE edge router 34), into queues Q0-Q2 on PHY-1 116a, which queues are each associated with a different level of QoS. Because the packets have already been multi-field classified, marked and shaped by the trusted CPE, boundary router 42 need not remark the packets. If, however, the sending CPE edge router were not a trusted CPE, boundary router 42 would also need to remark and police packets received at LP-1 110a.

Following classification (and marking in the case of traffic received at LP-2 110b), traffic is forwarded to an appropriate physical port 116 or logical port 110 by forwarding function 118. In contrast to edge router 34 of FIG. 5, which utilizes classifiers to perform the full forwarding lookup, boundary router 42 employs an alternative design in which forwarding function 118 accesses forwarding table 128 with a packet's DA to determine the output port, namely, LP-1 110a, LP-2 110b, or PHY-1 116a in this example. In the case of a non-VPN router, forwarding table 128 is populated by generic IP routing protocols (e.g., Border Gateway Protocol (BGP)) or static configuration (e.g., association of the 24-bit IP address prefix "d.e.f." with LP-2 110b). An alternative implementation could centrally place the IP lookup forwarding function in forwarding function 62. The exemplary implementation shown in FIG. 6 assumes that boundary router 42 sends all traffic bound for the network core to only one of the physical ports 116 connected to a core router. In other embodiments, it is possible, of course, to load balance traffic across physical ports 116. In addition, implementations omitting the core router or employing one or more logical ports to one or more core routers are straightforward extensions of the depicted design.

For traffic communicated to access network 38 through boundary router 42, classifier 132 accesses classifier table 134 utilizing the DSCP of the packets to direct each packet to the appropriate one of queues Q0-Q-2 for the QoS indicated by the packet's DSCP. For a customer that has purchased a Diffserv-enabled logical port 110, this has the effect of delivering the desired QoS since the source CPE has policed and marked the flow with appropriate DSCP value. Although a best-effort customer is capable of receiving higher quality traffic, preventing such a one-way differentiated service would require significant additional complexity in the classifier and include distribution of QoS information via routing protocols to every edge router in a service provider network.

Figure 6B:
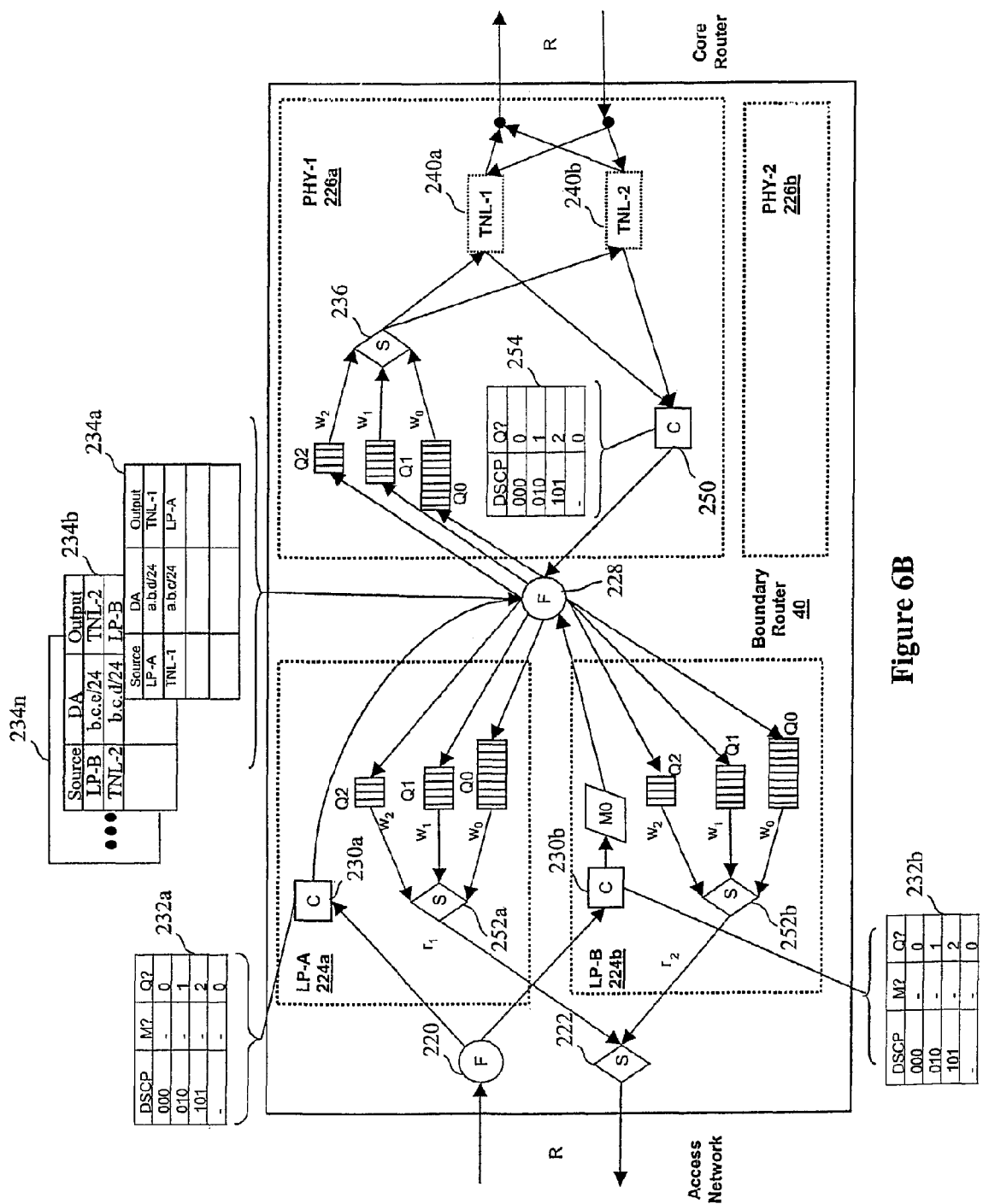
FIG. 6B is a more detailed block diagram of a QoS-aware boundary router having VPN function that may be utilized within the network architecture illustrated in FIG. 4.

With reference now to FIG. 6B, there is depicted a more detailed block diagram of a QoS-aware VPN boundary router 40, which may be utilized to provide Diffserv-enabled and DoS-protected VPN service within the network architecture depicted in FIG. 4. As shown, boundary router 40 includes a plurality of physical ports 226 for connection to core routers of Diffserv-enabled IP VPN network 44, a plurality of Diffserv-enabled logical ports 224 coupled to an access network 38 by a forwarding function 220 for incoming packets and a scheduler 222 for outgoing packets, and a forwarding function 228 that forwards packets between logical ports 224 and physical ports 226.

Each Diffserv-enabled logical port 224 implemented on boundary router 40 serves a respective one of a plurality of VPNs. For example, Diffserv-enabled logical port LP-A 224a serves a customer site belonging to VPN A, which includes customer sites having the 24-bit IP address prefixes "a.b.c." and "a.b.d." Similarly, Diffserv-enabled logical port LP-B 224b serves a customer site belonging to VPN B, which includes two customer sites having the 24-bit IP address prefixes "b.c.d." and "b.c.e." Diffserv-enabled logical ports 224 do not serve sites belonging to best effort IP public network 46 since such traffic is routed to boundary routers 42, as shown in FIG. 4.

As further illustrated in FIG. 6B, each core-facing physical port 226 of boundary router 40 is logically partitioned into a plurality of sub-interfaces implemented as logical tunnels 240. As will be appreciated by those skilled in the art, a tunnel may be implemented utilizing any of a variety of techniques, including an IP-over-IP tunnel, a Generic Routing Encapsulation (GRE) tunnel, an IPsec operated in tunnel mode, a set of stacked Multi-Protocol Label Switching (MPLS) labels, a Layer 2 Tunneling Protocol (L2TP), or a null tunnel. Such tunnels can be distinguished from logical ports in that routing information for multiple VPNs can be associated with a tunnel in a nested manner. For example, in the Border Gateway Protocol (BGP)/MPLS VPNs described in IETF RFC 2547, the topmost MPLS label determines the destination boundary router while the bottommost label determines the destination VPN.

In operation, a classifier 230 on each of Diffserv-enabled logical ports 224 classifies packets flowing from access network 38 through boundary router 40 to the network core of Diffserv-enabled IP VPN network 44 in accordance with the packets' DSCP values by reference to a respective classifier table 232. As depicted, classifier tables 232a and 232b are accessed utilizing the DSCP as an index to determine the appropriate one of queues Q0-Q2 on physical port PHY-1 226a for each packet. Packets received by physical ports 226 are similarly classified by a classifier 250 by reference to a classifier table 254 to determine an appropriate one of queues Q0-Q2 for each packet on one of logical ports 224. After classification (and optional (re)marking as shown at LP-B 224b), forwarding function 228 switches packets between logical ports 224 and physical ports 226 by reference to VPN forwarding tables 234a-234n, which are each associated with a respective VPN. Thus, for example, VPN forwarding table 234a provides forwarding routes for VPN A, and VPN forwarding table 234b provides forwarding routes for VPN B.

VPN forwarding tables 234 are accessed utilizing the source port and DA as indices. For example, in the exemplary network configuration represented in forwarding table 234a, traffic within VPN A addressed with a DA having a 24-bit IP address prefix of "a.b.d." traverses TNL-1 240a, and traffic received at TNL-1 240b is directed to LP-A 224a. Similar routing between TNL-2 240b and LP-B 224b can be seen in VPN routing table 234b. As discussed above, VPN forwarding tables 234 can be populated by static configuration or dynamically utilizing a routing protocol.

Following processing by forwarding function 178, packets are each directed to the output port queue corresponding to their DSCP values. For example, packets marked with the QoS class associated with DSCP 101 are placed in Q2, packets marked with the QoS class associated with DSCP 010 are placed in Q1, and traffic marked with DSCP 000 is placed in Q0. Schedulers 236 and 252 then schedule output of packets from queues Q0-Q2 to achieve the requested QoS.

Figure 7:
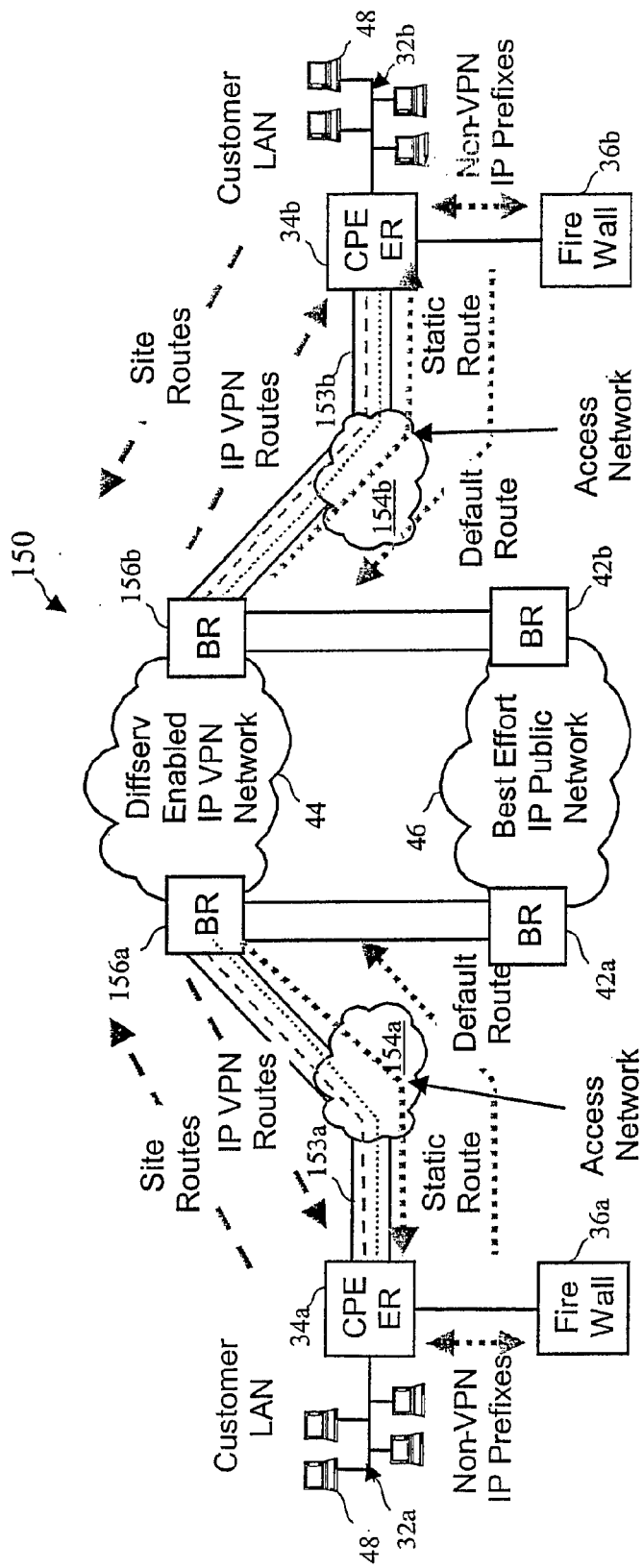
FIG. 7 illustrates an exemplary network architecture that provides a network-based VPN solution to the DoS attack problem.

With reference now to FIG. 7, there is illustrated an exemplary network architecture 150 that provides a network-based VPN solution to the DoS attack problem. In FIG. 7, like reference numerals and traffic notations are utilized to identify features corresponding to features of network architecture 30 depicted in FIG. 4.

As depicted, network architecture 150 of FIG. 7, like network architecture 30 of FIG. 4, includes a Diffserv-enabled IP VPN network 44, a best effort IP public network 46, and a plurality of customer Local Area Networks (LANs) 32. As above, customer LANs 32a and 32b belong to the same VPN and each include one or more hosts 48 that can function as a transmitter and/or receiver of packets. Each customer LAN 32 is coupled by a CPE edge router 34 and a physical access link 153 to a respective access network (e.g., an L2 or L3 access network) 154. In contrast to access networks 38 of FIG. 4, which have separate logical connections for QoS and best effort traffic, access networks 154 are only connected to boundary routers 156 of Diffserv-enabled IP VPN network 44, which have separate logical connections to boundary routers 42 of best effort IP public network 46. Thus, intra-VPN traffic destined for network 44 and extra-VPN traffic destined for network 46 are both routed through boundary routers 156, meaning that work-conserving scheduling between the two classes of traffic is advantageously permitted. However, as a consequence, the complexity of boundary routers 156 necessarily increases because each boundary router 156 must implement a separate forwarding table for each attached customer, as well as a full Internet forwarding table that can be shared among customers.

Figure 8:
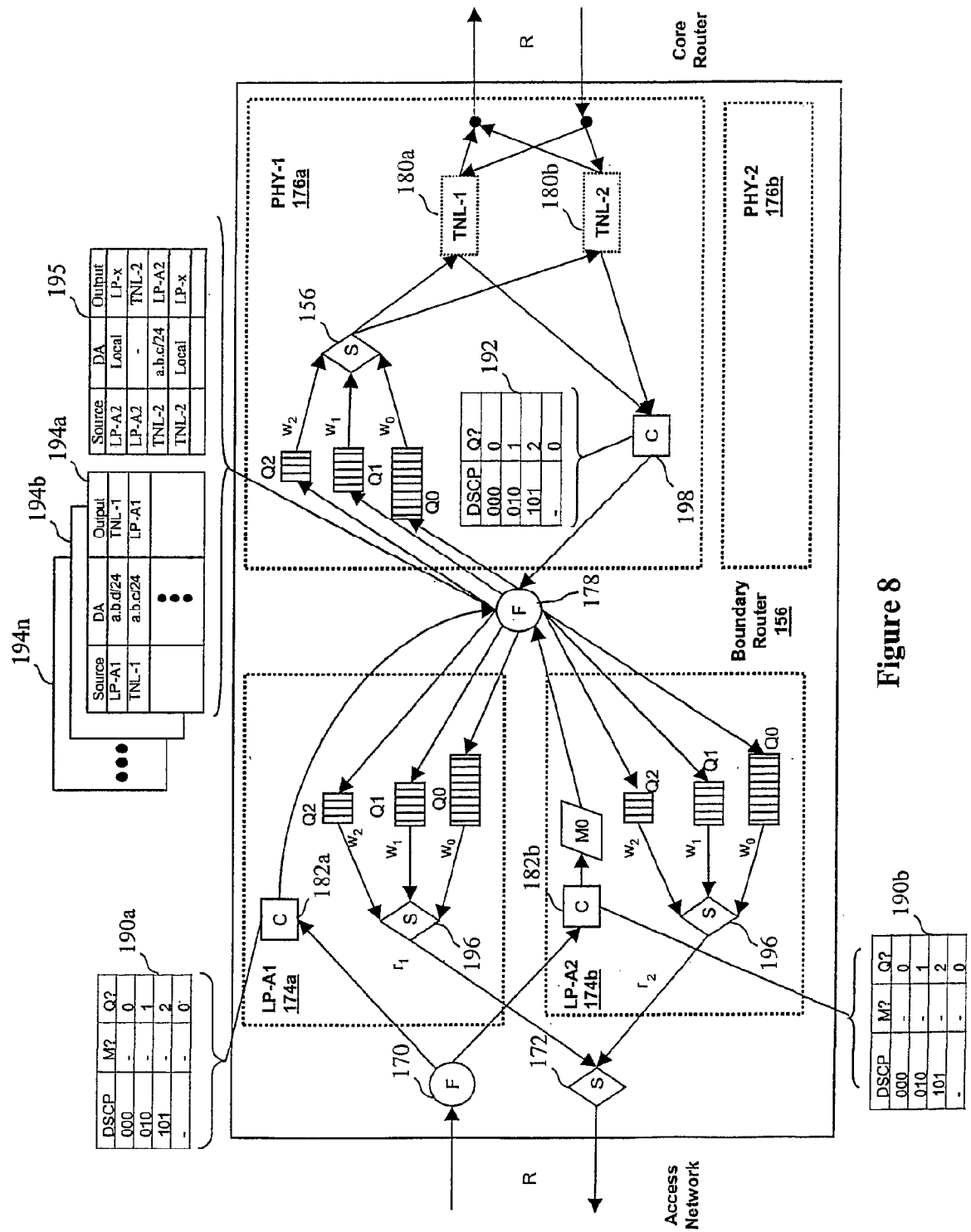
FIG. 8 is a more detailed block diagram of a QoS-aware VPN boundary router that may be utilized within the network architecture depicted in FIG. 7.

Referring now to FIG. 8, there is depicted more detailed block diagram of a QoS-aware VPN boundary router in which the policers, shapers, schedulers, logical port access network connections and forwarding tables are configured to provide Diffserv-enabled and DoS-protected VPN service within the network architecture depicted in FIG. 7. As shown, boundary router 156 includes a plurality of physical ports 176 for connection to network core routers, a plurality of Diffserv-enabled logical ports 174 coupled to access network 154 by a forwarding function 170 for incoming packets and a scheduler 172 for outgoing packets, and a forwarding function 178 that forwards packets between logical ports 174 and physical ports 176.

Because each CPE edge router 34 is coupled to a boundary router 156 by only a single access link through access network 154, each network customer site is served at boundary router 156 by a pair of Diffserv-enabled logical ports 174, one for intra-VPN traffic and one for extra-VPN traffic. For example, Diffserv-enabled logical ports LP-A1 174a and LP-A2 174 serve a single customer site belonging to VPN A, which includes at least two customer sites having the 24-bit IP address prefixes "a.b.c." and "a.b.d." In the depicted embodiment, LP-A1 174a provides access to QoS traffic communicated across Diffserv-enabled IP VPN network 44 to and from sites belonging to VPN A, while LP-A2 174b provides access to best effort traffic to and from best effort IP public network 46.

As further illustrated in FIG. 8, each core-facing physical port 176 of boundary router 156 is logically partitioned into a plurality of sub-interfaces implemented as logical tunnels 180. As will be appreciated by those skilled in the art, a tunnel may be implemented utilizing any of a variety of techniques, including an IP-over-IP tunnel, a Generic Routing Encapsulation (GRE) tunnel, an IPsec operated in tunnel mode, a set of stacked Multi-Protocol Label Switching (MPLS) labels, or a null tunnel. Such tunnels can be distinguished from logical ports in that routing information for multiple VPNs can be associated with a tunnel in a nested manner. For example, in the Border Gateway Protocol (BGP)/MPLS VPNs described in IETF RFC 2547, the topmost MPLS label determines the destination boundary router while the bottommost label determines the destination VPN.

In operation, a classifier 182 on each of Diffserv-enabled logical ports 174 classifies packets flowing from access network 154 through boundary router 156 to the network core in accordance with the packets' DSCP values by reference to a respective classifier table 190. As depicted, classifier tables 190a and 190b are accessed utilizing the DSCP as an index to determine the appropriate one of queues Q0-Q2 on physical port PHY-1 176a for each packet. Packets received by physical ports 176 are similarly classified by a classifier 198 by reference to a classifier table 192 to determine an appropriate one of queues Q0-Q2 for each packet on one of logical ports 174. After classification (and optional (re)marking as shown at LP-A2 174b), forwarding function 178 switches packets between logical ports 174 and physical ports 176 by reference to VPN forwarding tables 194a-194n, which are each associated with a respective VPN and shared Internet forwarding table 195. Thus, for example, forwarding table 194a contains entries providing forwarding routes for VPN A, while Internet forwarding table 195 contains entries providing forwarding routes for packets specifying LP-A2 or TNL-2 (i.e., the logical interfaces configured for Internet access) as a source.

Forwarding tables 194 are accessed utilizing the source port and DA as indices. For example, in the exemplary network configuration represented in forwarding table 194a, intra-VPN traffic addressed with a DA having a 24-bit IP address prefix of "a.b.d." traverses TNL-1 180a, while extra-VPN (i.e., Internet) traffic traverses TNL-2 180b (which could be a null tunnel). Forwarding table 194a further indicates that intra-VPN traffic received via TNL-1 180a is directed to LP-A1 174a, and all other traffic arriving from the Internet via tunnel TNL-2 180b addressed with a DA having a 24-bit IP address prefix of "a.b.c." is sent to LP-A2 174b. Traffic that terminates to other ports on boundary router 156 (i.e., traffic having a Local DA) is sent to other ports of boundary router 156 (indicated as LP-x). In other words, the entries in forwarding table 194a marked "Local" specify address prefixes other than those assigned to VPNs (e.g., a.b.c/24) that are assigned to interfaces on boundary router 156.

Following processing by forwarding function 178, packets are each directed to the output port queue corresponding to their DSCP values. For example, packets marked with the QoS class associated with DSCP 101 are placed in Q2, packets marked with the QoS class associated with DSCP 010 are placed in Q1, and best effort traffic marked with DSCP 000 is placed in Q0. Schedulers 196 then schedule output of packets from queues Q0-Q2 to achieve the requested QoS.

As has been described, the present invention provides an improved network architecture for providing QoS to intra-VPN traffic while protecting such flows against DoS attack from sources outside the VPN. The present invention provides DoS-protected QoS to selected flows utilizing a network-based VPN service and a best effort Internet service connected to a CPE edge router using a L2 access network with appropriately configured routing protocols. Diffserv marking at the edge and handling in the network-based VPN core provides QoS to selected flows while logically partitioning intra-VPN and extra-VPN traffic to prevent DoS to a VPN network customer site due to traffic originating from outside of the customer's VPN exceeding that site's access capacity. Even further protection from traffic originating from within the customer's VPN is possible using Intserv policy control, implemented on the CPE edge router and/or the QoS-aware boundary router, as described in IETF RFC 2998, incorporated herein by reference.

The network architecture of the present invention may be realized in CPE-based and network-based implementations. The CPE-based implementation permits easy configuration of the access networks linking the CPE edge routers and service provider boundary routers and permits QoS to be offered to VPN sites without implementing Diffserv across the entire service provider network. The network-based configuration advantageously permits work conserving scheduling that permits extra-VPN traffic to utilize excess access capacity allocated to intra-VPN traffic.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. For example, although the present invention has been described with respect to preferred embodiments in which network-based VPNs are implemented within a Diffserv network, it should be understood that the present invention is not restricted to use with Diffserv networks, but is instead to other network-based VPNs, which may be implemented, for example, utilizing BGP/MPLS as taught in RFC 2547 or virtual routers as taught in RFC 2917. In addition, although FIGS. 3, 4 and 7 illustrate the connection of each CPE edge router to a VPN network and a best effort network by one access link, it should be understood that, for redundancy, a CPE edge router may be connected by multiple access links to one or more access networks, which provide logical connections to one or more boundary routers of each of the VPN and best effort networks. In such "dual homing" implementations, the multiple access links can be utilized in either a primary/backup or load-sharing arrangement through installation of static routes in the service provider boundary routers or dynamic configuration of the service provider boundary routers utilizing routing protocols (e.g., EBGP). This would require that the CPE edge router implement multiple forwarding tables and separate instances of the routing protocol for the VPN and Internet access address spaces. The implementation of such a CPE edge router would be similar to that illustrated in FIG. 8 and described in the associated text, with only a single VPN table and a single table for Internet routes.

What is claimed is:

1. A method comprising:
    establishing a virtual private network (VPN) that includes a first ingress boundary router and a first egress boundary router, the first egress boundary router being configured to communicate with a destination host, wherein the first ingress boundary router is configured to communicate with a second ingress boundary router of a public data network, and wherein the first egress boundary router is configured to communicate with a second egress boundary router of the public data network, the second egress boundary router being configured to communicate with the destination host;
    transmitting only packets originating from sources within the VPN and targeting the destination host to the first egress boundary router via the VPN to prevent denial of service attacks originating from sources outside the VPN; and
    transmitting packets originating from sources outside the VPN and targeting the destination host to the second egress boundary router via the public data network.

2. A method according to claim 1, wherein the first egress boundary router and the second egress boundary router utilize separate logical connections over an egress access network to the destination host.

3. A method according to claim 1, wherein the first ingress boundary router and the second ingress boundary router have connectivity to an ingress access network, the ingress access network transmitting packets having both source and destination addresses belonging to the VPN to the first ingress boundary router and transmitting other packets to the second ingress boundary router.

4. A method according to claim 3, wherein the ingress access network has connectivity to a customer premise equipment (CPE) edge router that includes a classifier that classifies at least some packets for routing to one of the first ingress boundary router or the second ingress boundary router based on host service markings in the packets.

5. A method according to claim 1, wherein the VPN is implemented within a Differentiated Services domain.

6. A method according to claim 1, further comprising:
    assigning a higher priority to traffic received from the first egress boundary router than traffic received from the second egress boundary router.

7. A method according to claim 1, wherein the first egress boundary router is configured to shape traffic destined for the destination host to prevent starvation of traffic of the second egress boundary router.

8. A method according to claim 1, wherein the first egress boundary router is configured to shape traffic destined for the destination host to a first rate, and the second egress boundary router is configured to shape traffic destined the destination host to a second rate, wherein the sum of the first rate and the second rate is no greater than a transmission capacity of an access link to the destination host.

9. A method according to claim 1, wherein the first ingress boundary router includes:
    first and second logical input interfaces for receiving traffic destined for the VPN and for the public data network, respectively;

first and second logical output interfaces for transmitting traffic over the VPN and the public data network, respectively; and a forwarding function that switches packets received at the first logical input interface to the first logical output interface and that switches packets received at the second logical input interface to the second logical output interface.

10. A method according to claim 1, wherein the first egress boundary router includes:

first and second logical input interfaces for receiving traffic from the VPN and from the public data network, respectively;

a first logical output interface and a second logical output interface respectively coupled to separate first and second logical connections on an egress access network, wherein the first logical output interface transmits traffic received from the VPN utilizing the first logical connection and the second logical output interface transmits traffic received from the public data network utilizing the second logical connection; and a forwarding function that switches packets received at the second logical input interface to the second logical output interface.

11. A method according to claim 10, wherein the first egress boundary router includes a scheduler, coupled to each of the first and second logical output interfaces, that transmits packets from the first and second logical output interfaces onto the egress access network, wherein the scheduler grants a higher priority to traffic from the first logical output interface than to traffic from the second logical output interface.

12. A method according to claim 11, wherein the scheduler is configured to perform work-conserving scheduling on outgoing traffic from the first and second logical output interfaces.

13. A method according to claim 10, wherein the VPN is one of a plurality of VPNs, and wherein the forwarding function has a corresponding plurality of VPN forwarding tables and a shared forwarding table for best effort traffic.

14. A method comprising:

determining whether traffic received from a source is internal virtual private network (VPN) traffic or external virtual private network (VPN) traffic;

directing the traffic to a destination over a virtual private network (VPN) if the traffic is determined to be internal VPN traffic;

directing the traffic to the destination over a public data network if the traffic is determined to be external VPN traffic, wherein the internal VPN traffic is assigned a higher precedence than the external VPN traffic to prevent denial of service attacks;

forwarding the internal VPN traffic over a first logical connection to a first ingress boundary router within the VPN that includes a first egress boundary router having connectivity to the destination; and forwarding the external VPN traffic over a second logical connection to a second ingress boundary router within the public data network that includes a second egress boundary router having connectivity to the destination.

15. A method according to claim 14, wherein the first ingress boundary router and the second ingress boundary router have connectivity to an ingress access network, the ingress access network transmitting packets having both source and destination addresses belonging to the VPN to the first ingress boundary router and transmitting other packets to the second ingress boundary router.

16. A method according to claim 14, further comprising:

classifying the traffic for routing to one of the first ingress boundary router or the second ingress boundary router based on host service markings in the traffic.

17. A method according to claim 14, wherein the VPN is implemented within a Differentiated Services domain.

18. An apparatus comprising:

a processor having a forwarding function configured to determine whether traffic received from a source is internal virtual private network (VPN) traffic or external virtual private network (VPN) traffic, the forwarding function being configured to direct the traffic to a destination over a virtual private network (VPN) if the traffic is determined to be internal VPN traffic, and the forwarding function being configured to direct the traffic to the destination over a public data network if the traffic is determined to be external VPN traffic, wherein the internal VPN traffic is assigned a higher precedence than the external VPN traffic to prevent denial of service attacks, and wherein the forwarding function is further configured to forward the internal VPN traffic over a first logical connection to a first ingress boundary router within the VPN that includes a first egress boundary router having connectivity to the destination, and to forward the external VPN traffic over a second logical connection to a second ingress boundary router within the public data network that includes a second egress boundary router having connectivity to the destination.

19. An apparatus according to claim 18, wherein the first ingress boundary router and the second ingress boundary router have connectivity to an ingress access network, the ingress access network transmitting packets having both source and destination addresses belonging to the VPN to the first ingress boundary router and transmitting other packets to the second ingress boundary router.

20. An apparatus according to claim 18, further comprising:

a classifier configured to classify the traffic for routing to one of the first ingress boundary router or the second ingress boundary router based on host service markings in the traffic.

21. An apparatus according to claim 18, wherein the VPN is implemented within a Differentiated Services domain.

* * * * *